United States Patent [19]

Bader

[11] 4,144,910
[45] Mar. 20, 1979

[54] FLAT HOLLOW SECTION MEMBER FOR A TEXTILE MACHINE

[76] Inventor: Hartmann Bader, St. Georgenstrasse 13, 8400 Winterthur, Switzerland

[21] Appl. No.: 793,256

[22] Filed: May 3, 1977

[30] Foreign Application Priority Data

Jun. 8, 1976 [CH] Switzerland .................. 7171/76

[51] Int. Cl.² ................ D03C 9/06; D03D 49/00
[52] U.S. Cl. .................... 139/91; 139/1 R; 181/290
[58] Field of Search ............ 139/91, 92, 82, 88, 139/1 R; 248/358 R, 35 R; 181/290, 293, 294, 295

[56] References Cited

U.S. PATENT DOCUMENTS

| 624,577 | 5/1899 | Thompson | 248/358 R |
|---|---|---|---|
| 2,300,197 | 10/1942 | Brown | 139/92 |
| 2,635,858 | 4/1953 | Keller | 248/358 R |
| 3,534,936 | 10/1970 | Knowlton | 248/358 R |
| 3,889,721 | 6/1975 | Wagner | 139/91 |
| 3,948,296 | 4/1976 | Koch | 139/91 |

FOREIGN PATENT DOCUMENTS

| 2018050 | 5/1970 | France | 139/91 |
|---|---|---|---|
| 1189251 | 3/1965 | Fed. Rep. of Germany | 181/290 |
| 6911347 | 1/1971 | Netherlands | 139/91 |
| 434144 | 10/1967 | Switzerland | 139/91 |
| 488035 | 5/1970 | Switzerland | 139/91 |

*Primary Examiner*—James Kee Chi
*Attorney, Agent, or Firm*—Kenyon & Kenyon, Reilly, Carr & Chapin; Kenyon & Kenyon, Reilly, Carr & Chapin

[57] ABSTRACT

The flat hollow section member is provided with one or more apertures in at least one of two oppositely disposed walls as well as with an insert of vibration-damping material. The insert is of a thickness to abut each wall and is of greater dimension than the aperture. Also, the insert may be of solid, annular or hollowed shape and may be shouldered to project through the aperture, for example to form a guide surface for the section member. The section member can be used as part of a weaving shaft or as a rod-like or bar-like element in a drive shaft of a weaving machine.

16 Claims, 10 Drawing Figures

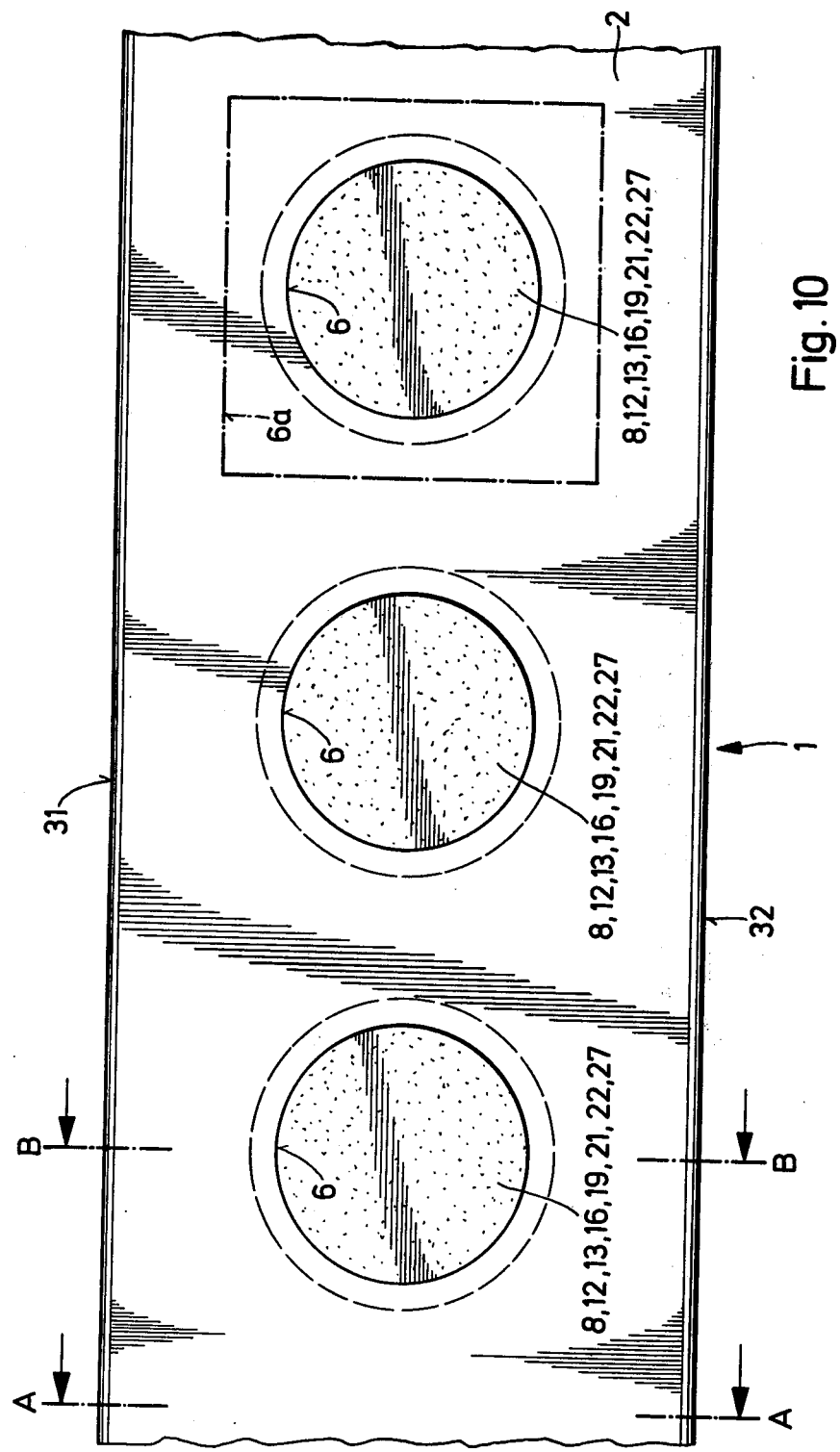

FLAT HOLLOW SECTION MEMBER FOR A TEXTILE MACHINE

This invention relates to a flat hollow section member for a textile machine and, particularly, to a section member used as a moving part of a textile machine such as in shedding beams or shedding drives of a weaving machine.

In the known shafts of weaving machines, the longitudinal and transverse beams are usually embodied by hollow section members which have interiors which are virtually empty. During weaving, these section members may experience bending vibrations both in the direction of the warp heddles suspended in the shafts and perpendicularly to the plane thereof. In particular, the bending vibrations perpendicular to the shaft plane may cause the beams to produce considerable air-borne noise.

Accordingly, it is an object of the invention to damp vibrations in flat hollow section members used in textile machines.

It is another object of the invention to reduce the noise arising in the operation of a weaving machine.

Briefly, the invention provides a flat hollow section member for a textile machine which comprises a pair of oppositely disposed interconnected walls with at least one wall having at least one aperture and an insert of vibration-damping material received between the walls in alignment with the aperture. The vibration-damping material may be rubber or a plastics, such as a polyvinyl chloride or a polyurethane, which has a relatively high damping constant.

The insert is of a corresponding peripheral shape to each aperture and can form a connection between the walls of the section member and provide attenuation particularly of vibrations arising from movements of the walls toward one another. The use of the hollow section member can therefore reduce the noise arising in the operation e.g. of a weaving machine.

These and other objects and advantages of the invention will become more apparent from the following detailed description and appended claims taken in conjunction with the accompanying drawings in which:

FIG. 10 illustrates a side view of a section member according to the invention.

Like reference characters indicate like parts in the various Figures of the drawings.

Figure 1:
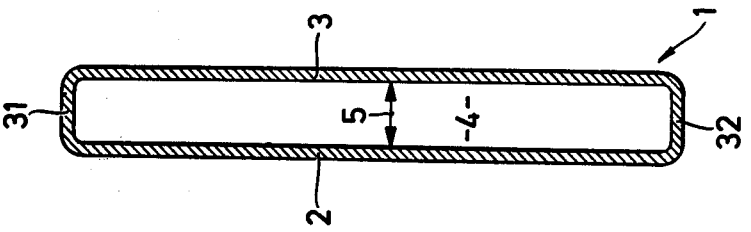
FIG. 1 illustrates a sectional view taken on line A—A of FIG. 10 of a bar-like or rod-like flat hollow section member according to the invention.

Referring to FIGS. 1 and 10, a flat bar-like or rod-like hollow section member 1 forming part of a weaving shaft has a pair of parallel walls 2, 3 which are oppositely disposed and interconnected by parts 31, 32. As shown, the member 1 encloses an internal space 4 of a determined width 5.

Figure 2:
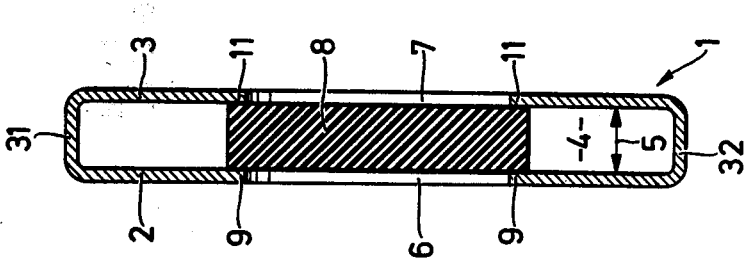
FIG. 2 illustrates a corresponding view taken on line B—B of FIG. 10.

Referring to FIG. 2, the walls 2, 3 are formed with apertures 6, 7 and a one piece insert 8, e.g. of rubber is disposed within the section member in alignment with the apertures 6, 7. The insert 8 is dimensioned of greater size than the apertures 6, 7 in the regions 9, 11 so as to abut against the walls 2, 3. Before being pressed into the member 1, the insert 8 has a thickness which is at least the same as the width 5 of the space 4 between the two walls 2, 3. The insert 8 thus forms a connection between the two walls 2, 3 so that vibrations of the walls 2, 3 can be damped.

The insert 8 can be adhesively secured to the walls 2, 3 in the regions 9, 11 so as to be secured against moving towards the walls 2, 3. As a variant, the insert 8 is retained in the closed section member 1 without adhesion just by its own resilience. As shown, the insert 8 is flush with the outer surfaces of the walls 2, 3 of the member 1.

Figure 3:
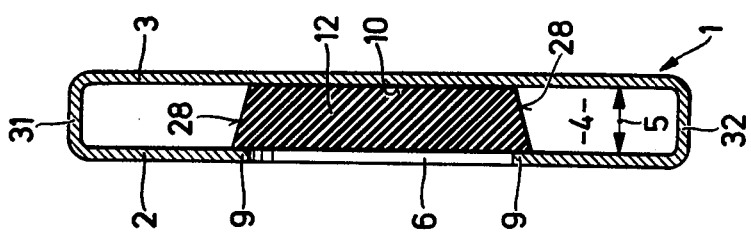

Referring to FIG. 3, only one wall 2 of the hollow section member 1 need be formed with an aperture 6. In this case the insert 12 has bevelled flanks or sides 28 to facilitate introduction into the section member 1. Also, the insert 12 can be adhesively secured to the wall 3 just in the region 10.

Figure 4:
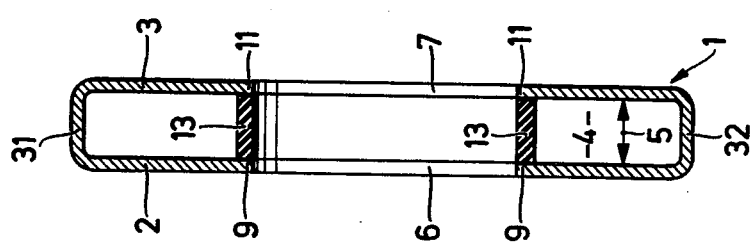

Referring to FIG. 4, the insert 13 can alternatively take the form of a ring and be merely stuck in between the walls 2, 3.

Figure 5:
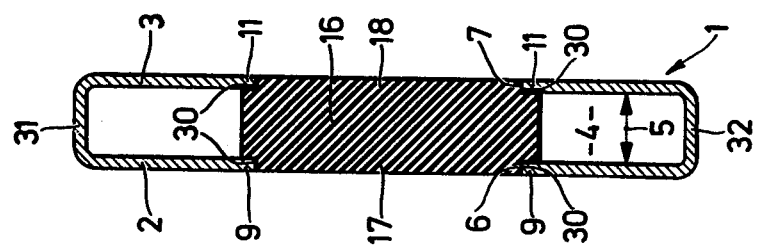
FIGS. 3-9 are corresponding sectional views through variants of an insert according to the invention.

Referring to FIG. 5, the insert 16 may also have thickened parts 17, 18, which form shoulders 30, on both sides near the apertures 6, 7. These parts 17, 18 also extend into or fill up the apertures 6, 7 and prevent the insert 16 from shifting towards the wall.

Figure 6:
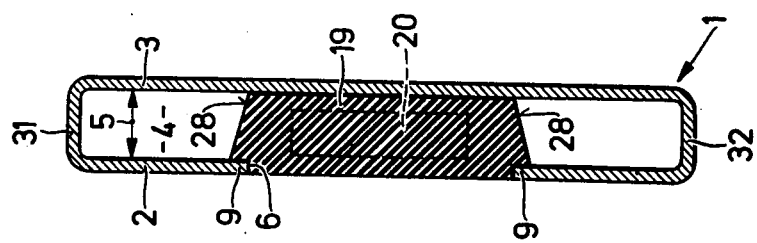

Referring to FIG. 6, the insert 19 may also have a thickened part 17 just on one side with the part 17 closing the aperture 6. The sound-damping insert 19 can also be formed with a hollow interior 20, as indicated by chain lines to reduce mass and weight.

Figure 7:
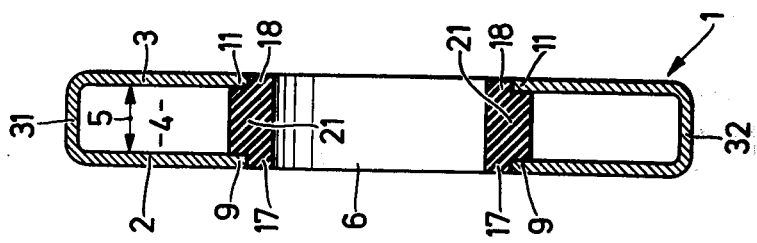

Referring to FIG. 7, the insert 21 may also be annular with thickened parts 17, 18 forming shoulders 30 inside the apertures 6, 7. As above, the parts 17, 18 extend into the apertures 6, 7.

Figure 8:
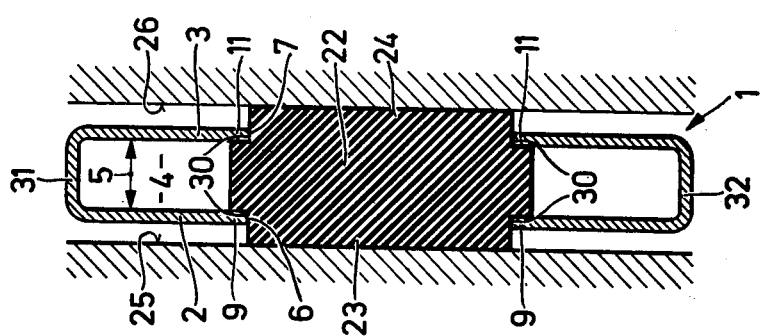

Referring to FIG. 8, the insert 22 may have thickened parts 23, 24 which project beyond the walls 2, 3 to form guide surfaces 25, 26 disposed a few millimeters away from the walls 2, 3. These parts 23, 24 thus serve as rubbing elements for movements of the member 1 towards the walls 2, 3.

Figure 9:
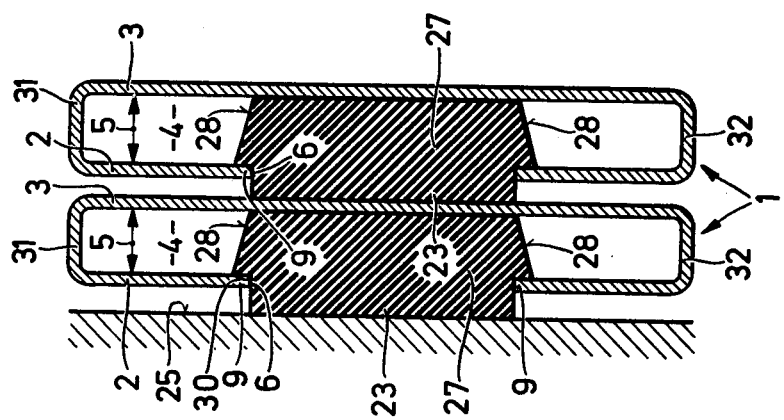

Referring to FIG. 9, each insert 27 may have a thickened part 23 just on one side which serves as a rubbing element on the adjacent guide 25 or wall 3 of the adjacent section member 1.

The apertures 6, 7 and the inserts 8, 12, 13, 16, 19, 21, 22, 27 can be e.g. circular, as shown in FIG. 10, and can be disposed one beside another to a fairly large number. In alternative forms, the apertures 6a can be rectangular, for instance, as indicated by chain-dotted lines in FIG. 10, while the inserts introduced into such apertures have a corresponding rectangular shape.

A hollow section member may also be constructed with three or more walls corresponding to the walls 2, 3. In this case, inserts (8, 12, 13, 16, 19, 21, 22, 27) can be introduced between all the walls via appropriate apertures 6, 7. The walls 2, 3, instead of being parallel, may include an acute angle of a few degrees with one another.

The hollow section member can be used as a rod-like or bar-like element in the shaft drive of a weaving machine. Such elements are used e.g. to transmit the movement produced by a tappet shedding motion or a dobby machine to the shafts.

What is claimed is:

1. A flat hollow section member of a textile machine comprising a pair of oppositely disposed inter-connected walls, at least one of said walls having at least one aperture therein and an insert of vibration-demping material received between said walls in alignment with said aperture, said insert being of a corresponding peripheral shape to said aperture and being of a size between said walls greater than said aperture to abut against said one wall peripherally about said aperture.

2. A section member as set forth in claim 1 wherein said insert is of one piece, has a thickness at least equal to the distance between said walls, and is flush with the outer surfaces of said walls.

3. A section member as set forth in claim 1 wherein said insert projects from within said member through said aperture and has a shoulder abutting said one wall about said aperture.

4. A section member as set forth in claim 1 wherein said insert projects beyond said one wall to form a guide surface for the section member.

5. A section member as set forth in claim 1 wherein said insert is of wedge-shaped cross-section.

6. A section member as set forth in claim 1 wherein said insert is a disc.

7. A section member as set forth in claim 1 wherein said insert is a ring.

8. A section member as set forth in claim 1 wherein said insert engages positively in said aperture.

9. A section member as set forth in claim 1 wherein said insert is adhesively secured to at least one of said walls.

10. A section member as set forth in claim 1 wherein said insert has a hollow interior.

11. A section member as set forth in claim 1 wherein said walls are parallel.

12. A section member as set forth in claim 11 wherein said insert is made of a vibration-damping material selected from the group consisting of rubber and a plastics having a relatively high damping constant.

13. A flat hollow section member for a textile machine comprising a pair of oppositely disposed interconnected walls, at least one of said walls having a plurality of apertures therein and a plurality of inserts, each said insert being of vibration-damping material and received between said walls in alignment with a respective one of said apertures and being of a corresponding peripheral shape to said respective one aperture and of a size between said walls greater than said respective aperture to abut against said one wall peripherally about said respective aperture.

14. A section member as set forth in claim 1 wherein each said insert is of a thickness at least equal to the distance between said walls.

15. A section member as set forth in claim 13 wherein each aperture and each insert is circular.

16. A section member as set forth in claim 13 wherein each aperture and each insert is rectangular.

* * * * *

UNITED STATES PATENT AND TRADEMARK OFFICE
CERTIFICATE OF CORRECTION

PATENT NO. : 4,144,910
DATED : March 20, 1979
INVENTOR(S) : Hartmann Bader

It is certified that error appears in the above—identified patent and that said Letters Patent are hereby corrected as shown below:

Column 3, line 14, change "claim 1" to --claim 3--

Signed and Sealed this

Sixteenth Day of October 1979

[SEAL]

Attest:

RUTH C. MASON
Attesting Officer

LUTRELLE F. PARKER
Acting Commissioner of Patents and Trademarks